US010242213B2

United States Patent
Scaiano et al.

(10) Patent No.: US 10,242,213 B2
(45) Date of Patent: Mar. 26, 2019

(54) ASYMMETRIC JOURNALIST RISK MODEL OF DATA RE-IDENTIFICATION

(71) Applicant: Privacy Analytics Inc., Ottawa (CA)

(72) Inventors: Martin Scaiano, Ottawa (CA); Andrew Baker, Alcove (CA); Stephen Korte, Ottawa (CA); Khaled El Emam, Ottawa (CA)

(73) Assignee: PRIVACY ANALYTICS INC., Ottawa, ON (CA)

( * ) Notice: Subject to any disclaimer, the term of this patent is extended or adjusted under 35 U.S.C. 154(b) by 190 days.

(21) Appl. No.: 15/271,664

(22) Filed: Sep. 21, 2016

(65) Prior Publication Data

US 2017/0083719 A1     Mar. 23, 2017

Related U.S. Application Data (60) Provisional application No. 62/221,377, filed on Sep. 21, 2015.

(51) Int. Cl.

| | |
|---|---|
| *G06F 12/16* | (2006.01) |
| *G06F 12/14* | (2006.01) |
| *G06F 11/00* | (2006.01) |
| *G06F 21/62* | (2013.01) |
| *G06F 21/55* | (2013.01) |
| *G06F 17/30* | (2006.01) |

(52) U.S. Cl.
CPC .... *G06F 21/6218* (2013.01); *G06F 17/30979* (2013.01); *G06F 21/554* (2013.01)

(58) Field of Classification Search
CPC ........... G06F 21/6218; G06F 17/30979; G06F 21/554

USPC ......................................................... 726/25
See application file for complete search history.

(56) References Cited

U.S. PATENT DOCUMENTS

| | | | |
|---|---|---|---|
| 8,316,054 B2 | 11/2012 | El Emam et al. | |
| 9,280,684 B1* | 3/2016 | Kragh | G16H 10/60 |
| 9,442,980 B1* | 9/2016 | Trepetin | G06F 17/30477 |

(Continued)

OTHER PUBLICATIONS

Hui Zang; Anonymization of Location Data Does Not Work: A Large-Scale Measurement Study; ACM:2014; p. 145-156.*

(Continued)

*Primary Examiner* — Monjur Rahim
(74) *Attorney, Agent, or Firm* — John Maldjian; Maldjian Law Group LLC (57) ABSTRACT

System and method to produce an anonymized cohort, members of the cohort having less than a predetermined risk of re-identification. The system includes a user-facing communication interface to receive an anonymized cohort request comprising traits to include in members of the cohort; a data source-facing communication channel to query a data source, to find anonymized records that possess at least some of the requested traits; and a processor programmed to carry out the instructions of: forming a dataset from at least some of the anonymized records; calculating a risk of re-identification of the anonymized records in the dataset based upon the data query; perturbing anonymized records in the dataset that exceed a predetermined risk of re-identification, until the risk of re-identification is not greater than the pre-determined threshold, to produce the anonymized cohort; and providing, via a user-facing communication channel, the anonymized cohort.

16 Claims, 5 Drawing Sheets

(56) References Cited

U.S. PATENT DOCUMENTS

| | | | | |
|---|---|---|---|---|
| 2002/0169793 | A1* | 11/2002 | Sweeney | G06F 17/30424 |
| 2004/0199781 | A1* | 10/2004 | Erickson | G06F 17/30595 |
| | | | | 726/26 |
| 2006/0123461 | A1* | 6/2006 | Lunt | G06F 21/6254 |
| | | | | 726/1 |
| 2007/0255704 | A1* | 11/2007 | Baek | G06F 17/30 |
| 2008/0120296 | A1* | 5/2008 | Kariathungal | G16H 10/60 |
| 2009/0150362 | A1* | 6/2009 | Evenhaim | G06F 21/6254 |
| 2012/0151597 | A1* | 6/2012 | Gupta | G06F 21/6254 |
| | | | | 726/26 |
| 2013/0232550 | A1* | 9/2013 | Kihara | G06F 21/554 |
| | | | | 726/3 |
| 2013/0238625 | A1* | 9/2013 | Binkowski | G06F 19/326 |
| | | | | 707/737 |
| 2014/0189858 | A1* | 7/2014 | Chen | G06F 17/30289 |
| | | | | 726/22 |
| 2014/0237620 | A1* | 8/2014 | Ukil | G06F 21/60 |
| | | | | 726/26 |
| 2014/0324447 | A1* | 10/2014 | Dittus | G06Q 30/0269 |
| | | | | 705/2 |
| 2015/0007249 | A1* | 1/2015 | Bezzi | G06F 21/6254 |
| | | | | 726/1 |
| 2015/0169895 | A1* | 6/2015 | Gkoulalas-Divanis | |
| | | | | G06F 21/6227 |
| | | | | 726/26 |
| 2015/0379303 | A1* | 12/2015 | LaFever | G06F 21/6218 |
| | | | | 726/28 |
| 2016/0155061 | A1 | 6/2016 | Korte et al. | |
| 2016/0342636 | A1* | 11/2016 | Braghin | G06F 9/5055 |
| 2017/0083708 | A1* | 3/2017 | Braghin | G06F 21/60 |

OTHER PUBLICATIONS

Garfinkel, Simson L., "De-Identification of Personal Information," National Institute of Standards and Technology Internal Report 8053, Dec. 2015 (54 pages total).

Garfinkel, Simson L., "De-Identifying Government Datasets," National Institute of Standards and Technology Draft Special Publication 800-188, Aug. 2016 (65 pages total).

* cited by examiner

ASYMMETRIC JOURNALIST RISK MODEL OF DATA RE-IDENTIFICATION

CROSS-REFERENCE TO RELATED APPLICATIONS

This application claims the benefit of U.S. Provisional Application Ser. No. 62/221,377, filed on Sep. 21, 2015, the entire content of which is hereby incorporated by reference in its entirety.

BACKGROUND

Field

The present disclosure relates to risk assessment of datasets and in particular to assessing re-identification risk of a person identified in the dataset.

Description of Related Art

Information-based replacement has been proposed for traditional risk measures, such as k-anonymity, or expected number of correct re-identification, or re-identification risk. These measures can be derived from an information measure. The information can be used to estimate the number of anonymized records that could be mistaken for a specific original record. This approach is effective because it can account unequal probabilities of matching record. However, different types of re-identification scenarios can occur which require different methods for assessing re-identification risk. For example, a population-to-sample attempt (aka Acquaintance Attempt) is where an attacker chooses an acquaintance (or anyone whom they know great detail about, such as celebrity) from the population and then attempts to re-identify them in the sub sample. Another type of re-identification attempt may be sample to population (aka Public Attempt) where an attacker selects a subject from the sample, and then attempts to re-identify them against information in public registries. Each type of attack can present a different risk to the dataset.

Accordingly, systems and methods that enable improved risk assessment remains highly desirable.

BRIEF SUMMARY

Embodiments in accordance with the present disclosure include a system and a method to produce an anonymized cohort, members of the cohort having less than a predetermined risk of re-identification. The system includes a user-facing communication interface to receive an anonymized cohort request comprising traits to include in members of the cohort; a source-facing communication channel to query a data source, to find anonymized records that possess at least some of the requested traits; and a processor programmed to carry out the instructions of: forming a dataset from at least some of the anonymized records; calculating a risk of re-identification of the anonymized records in the dataset based upon the data source query; perturbing anonymized records in the dataset that exceed a predetermined risk of re-identification, until the risk of re-identification is not greater than the pre-determined threshold, to produce the anonymized cohort; and providing, via a user-facing communication channel, the anonymized cohort.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present disclosure will become apparent upon consideration of the following detailed description of embodiments thereof, especially when taken in conjunction with the accompanying drawings wherein like reference numerals in the various figures are utilized to designate like components, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary computing and storage system. Although well suited for use with, e.g., a system using a server(s), data sources and/or database(s), the disclosure is not limited to use with any particular type of computing, communication and storage system or configuration of system elements. Those skilled in the art will recognize that the disclosed techniques may be used in any computing, communication and storage application in which it is desirable to store protected data.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

A module that performs a function also may be referred to as being configured to perform the function, e.g., a data module that receives data also may be described as being configured to receive data. Configuration to perform a function may include, for example: providing and executing sets of computer code in a processor that performs the function; providing provisionable configuration parameters that control, limit, enable or disable capabilities of the module (e.g., setting a flag, setting permissions, setting threshold levels used at decision points, etc.); providing or removing a physical connection, such as a jumper to select an option, or to enable/disable an option; attaching a physical communication link; enabling a wireless communication link; providing electrical circuitry that is designed to perform the function without use of a processor, such as by use of discrete components and/or non-CPU integrated circuits; setting a value of an adjustable component (e.g., a tunable resistance or capacitance, etc.), energizing a circuit that performs the function (e.g., providing power to a transceiver circuit in order to receive data); providing the module in a physical size that inherently performs the function (e.g., an RF antenna whose gain and operating frequency range is determined or constrained by the physical size of the RF antenna, etc.), and so forth.

As used herein, the term "transmitter" may generally comprise any device, circuit, or apparatus capable of transmitting a signal. As used herein, the term "receiver" may generally comprise any device, circuit, or apparatus capable of receiving a signal. As used herein, the term "transceiver" may generally comprise any device, circuit, or apparatus capable of transmitting and receiving a signal. As used herein, the term "signal" may include one or more of an electrical signal, a radio signal, an optical signal, an acoustic signal, and so forth.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium excludes a computer readable signal medium such as a propagating signal. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Embodiments are described below, by way of example only, with reference to FIGS. 1-4. The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

Certain sensitive personal information like patient health information is protected by law (e.g., Healthcare Information Portability and Accountability Act ("HIPAA," codified at 42 U.S.C. § 300gg and 29 U.S.C § 1181 et seq. and 42 USC 1320d et seq.) in the U.S.) and must be treated in a way that maintains patient privacy. Such information is termed protected health information (PHI). With respect to PHI, it is important to avoid disclosing the PHI of a specific patient, or to disclose PHI so specific that it discloses an identity of a specific patient. All stake-holders involved must accept their stewardship role for protecting the PHI data contained within. It is essential that systems that access the PHI do so in full compliance with HIPAA and any other applicable laws or regulations of the country concerned, and in a secure manner.

Patient information, including PHI, is sometimes needed for medical studies. For example, observational studies are an important category of study designs. For some kinds of investigative questions (e.g., related to plastic surgery), randomized controlled trials may not always be indicated or ethical to conduct. Instead, observational studies may be the next best method to address these types of questions. Well-designed observational studies may provide results similar to randomized controlled trials, challenging the belief that observational studies are second-rate. Cohort studies and case-control studies are two primary types of observational studies that aid in evaluating associations between diseases and exposures.

Three types of observational studies include cohort studies, case-control studies, and cross-sectional studies. Case-control and cohort studies offer specific advantages by measuring disease occurrence and its association with an exposure by offering a temporal dimension (i.e. prospective or retrospective study design). Cross-sectional studies, also known as prevalence studies, examine the data on disease and exposure at one particular time point. Because the temporal relationship between disease occurrence and exposure cannot be established, cross-sectional studies cannot assess the cause and effect relationship.

Cohort studies may be prospective or retrospective. Retrospective cohort studies are well-suited for timely and inexpensive study design. Retrospective cohort studies, also known as historical cohort studies, are carried out at the present time and look to the past to examine medical events or outcomes. A cohort of subjects, selected based on exposure status, is chosen at the present time, and outcome data (i.e. disease status, event status), which was measured in the past, are reconstructed for analysis. An advantage of the retrospective study design analysis is the immediate access to the data. The study design is comparatively less costly and shorter than prospective cohort studies. However, disadvantages of retrospective study design include limited control the investigator has over data collection. The existing data may be incomplete, inaccurate, or inconsistently measured between subjects, for example, by not being uniformly recorded for all subjects.

Some medical studies, such as retrospective cohort studies, may involve authorized access by medical researchers to anonymized PHI, i.e., to PHI that ideally is not identifiable with the original patient. However, in practice there is nonzero risk that the anonymized data may be re-identified back to the original patient, for example, if data selection criteria is excessively narrow, thus risking that a very small pool of patients meet the selection criteria.

Re-identification risk considers how unique an individual looks. For example, suppose a dataset includes five people who look similar with respect to certain characteristics. Then the re-identification risk associated with those people and those characteristics would be 1/5, i.e., one over the number of people that they would look like in the dataset.

Traditionally, a risk of re-identification has been estimated by use of probabilities related to the size of the set of patients meeting one or more of the selection criteria. Analogizing to re-identification in a non-medical context, it is reputed that in the U.S., an exact date of birth, and a five-digit zip code, will allow for re-identification of about 95% of American residents, i.e., they would be unique within the zip code, and with that birthday. Therefore, cross-checking the zip code and birthday of a purportedly anonymized patient record with sources of public knowledge of zip code and birthday may result in a relatively high risk of re-identification. The analysis can be extended to combinations of patient data in a medical context, such as age, gender, weight, blood type, diagnosed conditions (e.g., diabetes, high cholesterol), family history, and so forth.

Traditionally, if a risk of re-identification for a data set is estimated to be too high (compared to a settable threshold), the estimated risk is reduced by usage of one or more of several techniques to perturb the data, such as suppressing the search results entirely, intentional suppression of specific matching returned records, inclusion of patient data from a wider selection criteria (e.g., a wider age band), intentionally returning patient records that do not meet all of the selection criteria, and so forth. However, these techniques necessarily degrade the returned data, with resulting effects on any findings based upon the degraded returned data. Therefore, estimation of the risk of re-identification is important, because overestimating the risk will result in a patient data set that has been unnecessarily degraded, but underestimating the risk will result in release of data that is overly susceptible to re-identification.

Embodiments in accordance with the present disclosure provide an improved estimation of a risk of re-identification. Improved estimation helps avoid unnecessary degradation of patient data used for medical studies, and helps avoid release of data that is susceptible to re-identification. Patient privacy is enhanced, and medical studies have access to better quality data.

The traditional method to re-identify a patient begins when an interesting but unidentified set of patient traits is observed in a database or other data source, and an attempt is made to identify who in the general public corresponds to the set of patient traits. The traditional method would gather publicly-knowable information about the unidentified patient (e.g., a zip code and a date of birth), and then find out a name of the unidentified patient by consulting a public directory (e.g., a voter registry) that may associate the publicly-knowable information with a patient name or other direct identifier. This method of attack is referred to herein as a public attack.

Embodiments in accordance with the present disclosure recognize that a second category of attack is possible. The second category of attack targets a specific person (e.g., a public figure) and attempts to find PHI of the specific person in the database or other data source. Such a second category of attack may proceed by first discovering as much information as practically possible about the specific person, e.g., by extracting publicly-known information such as information published in news media, information published in social media, information in public databases, and so forth. The extracted data is correlated with patient information in the dataset, and if a matching record is found in the database then the identity of the patient in the matched database record is assumed to be the same as the specific person who was targeted. The PHI in the matched database record then can be associated with the specific person. This method of attack is referred to herein as an acquaintance attack.

Other data sources may include, e.g., substantially any structured data source for which persons are represented as records and attributes of the persons are linked to the persons by the records. The data sources may be formatted as, but not limited to, TXT, CSV, JSON, XML, besides a database. Reference to "database" herein may include other data sources, unless otherwise stated or clearly implied.

In the second category of attack, it is guaranteed the target is in the database if the database covers everyone who could be in the dataset. However, if the database does not cover everyone who could be in the dataset, there is a probability less than 1.0 that the target is in the database. Furthermore, even if a match is found in the database, there is a probability greater than 0.0 that the match does not correspond to the targeted specific person.

Embodiments in accordance with the present disclosure may measure a risk of re-identification on data sets. In particular, embodiments consider the information that an adversary who is attempting to re-identification may have, e.g., by looking at what information is in the structured data. Some information is classified as a direct identifier, which means the information can be used directly to find the person using the direct identifier, e.g., a full first, middle and last name. Some other information is considered a quasi identifier ("Qi", or plural "Qis"), which partially identify a person. A Qi will narrow down to who may correspond to the Qi, but the Qi by itself is not sufficient to provide an exact match to a person. Examples of Qis may include age and date of birth.

Embodiments attempt to measure risk associated with these two attacks. In the background art, a sample to population attack (similar to a public attack) would include both public and acquaintance knowledge. Thus, the sample to population attack would return a high risk result due to a relatively large amount of detailed information from the acquaintance knowledge (e.g., medical history) incorrectly included. If an acquaintance attack is performed and only public knowledge is considered, the attack would end up never considering the public figure attack, for which an attacker uses information usually known only by an acquaintance (e.g., what the favorite restaurant is, specifics of credit card transactions with the favorite restaurant, etc.). Embodiments recognize that there are two different types of attacks, and none of the known prior art addresses these two types of attacks that behave differently. The amount of knowledge an attacker has, and how the attacker may apply that knowledge, differs in the two types of attacks.

Embodiments in accordance with the present disclosure achieve more accurate modeling of re-identification risk by considering the individual risk of public attacks (using only public knowledge) and acquaintance attacks (using both public and acquaintance knowledge) separately. The two different types of attack (i.e., acquaintance and public attacks) have different mathematical formulations because target selection is motivated differently. In many cases, the more accurate model avoids overestimating re-identification risk. Without overestimation of risk, it may not be necessary to perturb patient data to lower re-identification risk at the cost of data quality. The background art focuses on public attacks, without considering acquaintance risk. The inventors have discovered that public attacks often have significantly lower risk than acquaintance risk. Therefore, unless the risk of an acquaintance attack is separated from and calculated separately from the risk of a public attack, calculating overall re-identification risk would be inaccurate and possibly overly pessimistic.

Embodiments in accordance with the present disclosure classify the Qis into public Qis and acquaintance Qis. A medical record may contain a combination of public Qis and acquaintance Qis. Public Qis include details that are in public knowledge (i.e., in the public do-main) in a publicly available structured dataset separate from the medical record. Public Qis may include information publicly available from a large registry or the like (e.g., a voter registry). A voter registry typically will have information such as names, dates of birth, zip code, etc. However, the voter registry typically does not include information such as race, sexual orientation, recent activities, intimate medical conditions, etc.

Acquaintance QIs is information (typically non-public information) that someone who is somewhat familiar with a target person could know, e.g., a family member, a co-worker, a stalker, etc. For example, a medical record may include information about a high cholesterol count. A high cholesterol condition may not be public information, but it may be information that a family member or close friend may know because they know that the target person takes a statin drug.

However, not all nonpublic information about a target person would be an acquaintance Qi, even about a medical condition. For example, suppose a woman is about to give birth, so she goes into a hospital and starts to dilate. Her amount of dilation (e.g., in centimeters) could be considered an acquaintance Qi only if that information can be used to identify a target person. In the case of an amount of dilation, even if the specific number is shared with a small number of people (e.g., best friends), most acquaintances (e.g., co-workers) would not know the information, and it is not normally posted on social media (e.g., Facebook™). Thus, data of that sort is not commonly available to use for re-identifications, and therefore would not be considered to be an acquaintance Qi. In contrast, more widely shared information such as a delivery date, a day she actually gave birth, weight of the baby, etc. each might be a Qi because that information is knowable, and is often posted on social media. The information may include statements from which information stored in the database may be inferred. For example, from a statement "We had a beautiful baby boy of this weight", it can be inferred an actual date of birth, baby's weight, and so forth.

The two types of Qis, are evaluated with two different risk measurements. A public risk measurement only uses public Qis, because they are the only things an attacker can reference to find a target person.

In another attack scenario, suppose an attacker selects an acquaintance as a target (e.g., as a target of cyber-stalking). The attacker may be very familiar with the target, and only one target is being attacked. The attacker would know things that are obvious and/or public knowledge about the target, e.g., gender and date of birth. Furthermore, the attacker would also know information commonly shared among acquaintances, e.g., significant personal events like illnesses and accidents (e.g., like having influenza, or having a broken bone), and so forth. Thus an assessment of risk would consider both public Qis and acquaintance Qis. The public Qis and acquaintance Qis together provide a longer list of identifiers that can be used for re-identification.

Risk assessment using public Qis and acquaintance Qis (i.e., acquaintance attack) is a risk assessment based on choosing a random person from the population, regardless whether the person is in fact within the sample. When constructing a subset (i.e., a sample) by selecting members from a larger set (i.e., a population), the random chance that a member of the population will be selected to be a member of the sample is given by the ratio of set sizes. For example, if randomly constructing a set of 100 people from among the entire U.S. population, the probability that any one person in the U.S. will be a member of the subset is 100 divided by the U.S. population.

However, suppose the selection of subset members from among the larger set is not random, but instead is a conditional probability based on whether the selected member has a specified trait. Whether the specified trait is publicly knowable (i.e., a public Qi) or is only knowable by acquaintances (i.e., an acquaintance Qi) potentially affects the conditional probability. For example, if the selection is based on a public Qi such as gender, then the larger set of the entire U.S. population is reduced by about half. If the selection is based on birthday, then the larger set of the entire U.S. population is reduced by a factor of about 365. Although a selection based on a public Qi reduces the larger set from which subset members are selected, the larger set may still be very large because the public Qi is not very selective.

In contrast, selection based upon an acquaintance Qi provides more criteria, in additional addition to the public Qis, to reduce the size of the larger set from which subset members are selected. Potentially, the size of the larger set may be greatly reduced, depending upon how narrow is the acquaintance Qi. For example, the acquaintance Qi may be related to a medical history of the attack target, or to some personal event not widely shared by the attack target.

The question arises then as to the re-identification risk using both the public Qis and acquaintance Qis. The question is related to the probability that a person can be a member of the subset. Taking the U.S. population as the larger set, the probability of any one person being included in a 100-person subset is exceedingly small if no Qis, or only broad public Qis are considered. However, if the larger set can first be narrowed by consideration of one or more relatively narrow acquaintance Qis, then the probability of inclusion may be significantly increased, e.g., if the larger set is reduced to a much smaller set size. The probability or risk of re-identification is directly related to the ratio of the sample data set size to the larger data set, which has been narrowed down by the inclusion of the acquaintance Qis found within the sample.

Embodiments in accordance with the present disclosure provide a system and method to accept a database query from a user, gather raw data from a database, calculate risk factors of re-identification based upon specificity of the database query, perturb the raw data to reduce a risk of re-identification, and delivering the perturbed data to the user in response to the database query. Embodiments may store raw data in the database such that data highly contributing to a risk of re-identification is stored separately from data that contributes little to a risk of re-identification. Storing separately may be physically, e.g., a separate database or separate tables within a database, etc. Storing separately may also be logical or procedural, e.g., by requiring controls such as extra authentication in order to access data that may highly contribute to a risk of re-identification.

More particularly, embodiments involve system and method to perform risk measurement, and to perform risk mitigation (e.g., data suppression or data generalization) if the measured risk is unacceptable. Risk measurement is able to answer the question of what is the risk of re-identification of a particular dataset, and that risk value is normally compared to a threshold risk value to determine whether or not the dataset can be released without modification with acceptable risk. Risk measurement of re-identification is with respect to the relevant threshold requirements (e.g., HIPAA) to protect PHI.

Embodiments in accordance with the present disclosure may calculate re-identification risk by considering what additional, external datasets a researcher has or may have access to, in order to augment the first dataset. The concern is that even if a re-identification risk is acceptably small if considering a first dataset, the researcher may be able to combine information from the first dataset with information from a second dataset and in the combination may create an unacceptable risk of re-identification. For example, records in the first dataset and records in the second dataset may share certain field definitions. If some records in the first dataset and the second dataset have substantially identical values in the shared fields, there is enhanced risk that such records in the first dataset and the second dataset refer to the same persons respectively, and thus the risk of re-identification is higher when considering the combined datasets (i.e., a superset of anonymized records in the first dataset and anonymized records in the second dataset).

Knowledge of what additional, external datasets a researcher has or may have access to may be obtained by asking the researcher. Alternatively, or in addition, a researcher may be prohibited from combining information from the first dataset with any additional, external datasets. The restriction can be a condition of access to the first dataset. Alternatively, it may be public knowledge or highly inferable that the researcher has access to certain datasets, and the risk of re-identification can be calculated assuming the researcher has access to the certain datasets, even if access has not in fact been confirmed by the researcher.

Once the re-identification risk has been determined, there may remain a need to provide the data (or at least substantially similar data) even if the re-identification risk exceeds a threshold. The question becomes, what techniques we be used to mitigate the re-identification risk. One technique is suppression, in which data records are removed from the dataset, e.g., if one patient is contributing a lot of risk, or has a very high risk, the suppression technique would delete the data record for the patient. The resulting suppressed database would have less risk, and would look like more of the general population.

Another technique to mitigate the re-identification risk is generalization, also referred to as perturbing a result returned in response to a database query. One method of generalization is to change or adjust the original, raw data or database records. For example, if a database query specifies an exact date, a generalized result may return records that are close to but not necessarily the same as the exact date. Records may be returned if the date is within a configurable number of days, or within the same week, or within the same month, etc. In this sense the precision of the returned data has been decreased.

Another method of generalization is to change or adjust numeric values, e.g., by adding a random noise factor. For example, if a query specifies an exact number for a parameter (e.g., a patient weight or range of weights, a blood pressure, etc.), the generalized result may include records in which a patient's true weight falls slightly outside the specified range (e.g., by +/−10 pounds). Patient weights may have a noise factor included to make it appear that the patient weight falls within the desired range. In some embodiments, adding a random noise factor may result in more data records being returned, e.g., patients whose true weight falls within the specified range plus patients whose true weight and noise factor together fall within the specified range. In other embodiments, the number of returned records may be approximately the same as without the added noise, by substituting returned records rather than adding additional records to the returned set.

Another method of perturbation is sub-sampling the dataset. For example, instead of releasing 100% of the data records that meet a selection criteria, only a portion of the matching records may be released, e.g., just 1% of the data records that meet the selection criteria. The resulting risk of re-identification is lower by the ratio of the released data records to the total number of data records. In the example above, i.e., releasing just 1% of the data records that meet the selection criteria, the risk of re-identification is reduced by a factor of 100.

Embodiments in accordance with the present disclosure are adaptable to use with text documents that are not in database form. Text documents are documents that include unstructured text that describe people. Examples of text documents include doctor's notes, notes by other treating professionals (e.g., nurses), and so forth. Unstructured documents are processed with a natural language discovery process, where relevant information is extracted into a semi-structured representation (including but not limited to a list, table, or graph model of the discovered Qis) of the information pertaining to the data subjects and are able to measure risk.

In particular, embodiments extract from text documents information that can be used to infer Qis, i.e., pieces of information that can be used to identify a person. For example, embodiments may search for a keyword such as "age" and then infer that a numeric value meeting certain constraints will be interpreted as an age. Constraints may include a textual distance limit (e.g., no more than one word away), or physical distance limit (e.g., no more than 0.5 inches away), or a limit on the value itself (e.g., between 1 and 110), and so forth. This technique can be used to detect other objective patient traits such as gender or ethnicity. In other examples, con-textual natural language processing may be used to interpret text and recognize some medical conditions such as an accident and/or information about it (e.g., a cause, circumstance, or result), a disease, a diagnosis, a patient condition, and so forth. The extracted and inferred information is then converted into a Qi, which may include transforming the data into a consistent format so it can be compared to data from other sources (e.g., other text documents or a database). Once the Qis are generated, a re-identification risk for the documents and the information therein can be calculated using the information.

Equivalence classes may be derived from the Qis. An equivalence class is a set of people who look like each other, based on a set of Qis. A person may be a member of multiple equivalence classes. Members of an equivalence class for one set of Qis may not all be members of an equivalence class based on a different set of Qis. For example, an equivalence class may be a set of all persons having an age between 30 and 40. When calculating a risk of re-identification, it is of interest to know what equivalence classes the target corresponds to, and what are the sizes of those equivalence classes.

For example, suppose that a set of Qis has produced an equivalence class, and let "KI" represent the class size of this equivalence class in the general population of a large area (e.g., a city, county, state, country, etc.). Furthermore, let there exist a subset of this equivalence class, such that all members of the subset share an additional Qi. For example, the subset may represent employees of a company within the large area. Let "k" represent the size of this equivalence class subset. For example, within a large city there may be hundreds of thousands of residents between the ages of 30-40, but within a specific company there may be only 10 persons within the age range who are both a resident of the city and an employee of the company. Knowledge that a person works at a specific company may be considered to be an acquaintance Qi, and the re-identification risk will be different depending upon whether the attacker is considering the entire equivalence class of size $K_i$, or the smaller subset of the equivalence class of size "$k_i$".

For example, suppose that an attacker knows acquaintance information that a target person suffers from a rare ailment. A person with a rare ailment would likely have a $K_i$ (i.e., a population equivalent class size) of close to one, because very few people will appear to look like the target with the rare ailment. The re-identification risk in this case will be very high. On the other hand, if the acquaintance information known to the attacker pertains to a common ailment (e.g., the common cold), a membership count in an equivalence class size is quite large (i.e., a large $K_i$), because the ailment is common—most persons in the U.S. population have had the common cold at some point, so it is very prevalent. Even with an additional Qi (e.g., that the target suffered the common cold within the past year), the resulting equivalence class size may still be very large if the new Qi does not provide a significant additional limit. The re-identification risk in this case will be very small.

A sampling fraction refers to the size of a sample, divided by a population from which the sample is drawn. For example, for a sample of 100 individuals drawn from the entire U.S. population, then the sampling fraction is approximately 100/360,000,000. On the other hand, a represented fraction refers to what portion of the population resembles or matches a target person in another way. For example, suppose by chance a sample was drawn from a large population such that the sample did not include any 42-year old females from Florida. Then a calculation of a represented fraction would exclude a count or consideration of all 42-year old females from Florida in the population group that the sample is selected from. The target must have a chance of actually appearing in the dataset question in order to be considered in the risk calculation. Therefore, if there is no one like the target in the dataset, then the target is not accounted for in the average risk calculation, e.g., neither as a public attack nor an acquaintance attack.

In another example, datasets often do not include infants and young children, unlike the general population. So if the target is an adult, then the represented fraction may not include in the denominator the population of infants and young children.

Embodiments in accordance with the present disclosure are usable with streaming data, e.g., dynamically adding data to a dataset while determining and assessing changes in risk arising from the data additions. In streaming, it is relatively straightforward to update the risk incrementally, because each person contributes a fixed proportion to the risk. With a sampling fraction, each patient in the U.S. always contributes to average risk in proportion to their share of the population (e.g., about 1/360,000,000). Given a fixed representative fraction, with streaming data one patient at a time is picked, the selected patient is added to a dataset, and the risk measurement is updated as new patient data is added. This computation has an advantage of being relatively easy and practical. If you want to calculate and use the represented population, the method would assess who is already in the dataset, and determine whether the target looks like someone already in the dataset. If the target does not resemble anyone in the dataset, there would be nothing to update because the target represents a new profile. For example, the target may have a new disease, or the age of the target may not be the same as anyone else in the dataset. Methods would update the represented fraction, and it will influence all of the previous calculations of the represented fraction. Methods may recalculate the entire risk over the entire dataset. A benefit of using the represented fractions is that persons who are known cannot match the target person are not counted toward a risk of re-identification.

A disadvantage of using the represented sampling fraction in a streaming approach is that the traits of persons in the dataset may not be known sufficiently well to make accurate assessments of numbers or percentages, leading to fluctuations in the represented population, which require re-computing risk over the entire dataset. An advantage of using the sampling fraction (not the represented sampling fraction) for streaming is that each patient contributes a fixed amount to the dataset risk and updating the dataset risk requires only updating summary numbers, as opposed to fully reprocessing the dataset.

Embodiments in accordance with the present disclosure may organize a hierarchical database to include a top-level ("L1") table, usually including one record per patient, and one patient per record. Each record of the L1 table normally includes invariant traits of the patient, such as demographics (e.g., date of birth or gender). Preferable, these traits would be known for all records in the L1 table. Persons within the L1 table each may be grouped into one or more classes, depending upon values of the invariant qualities. For example, there may be separate classes for each year, and a person will be in a class that corresponds to their birth year. Another pair of classes may be "male" or "female". Within any one class, patients may look alike and be symmetric with all other members of the class with respect to the patient invariant quality that defines the class. For example, a class may be defined by all patients that were born in 1978. However, class member may be different with respect to other traits, e.g., gender.

A next, lower-level in the database may be known as an "L2" table, which includes traits of members of the L1 table that distinguish between members of a class. For example, if person "A" and "B" are members of a class in the L1 table (and thus are symmetric with respect to the trait that defines the class), the L2 table may store additional traits that distinguish between "A" and "B". These additional traits may not be invariant traits that would merit inclusion in the L1 table, or may not be known for all persons in the database.

Figure 5:
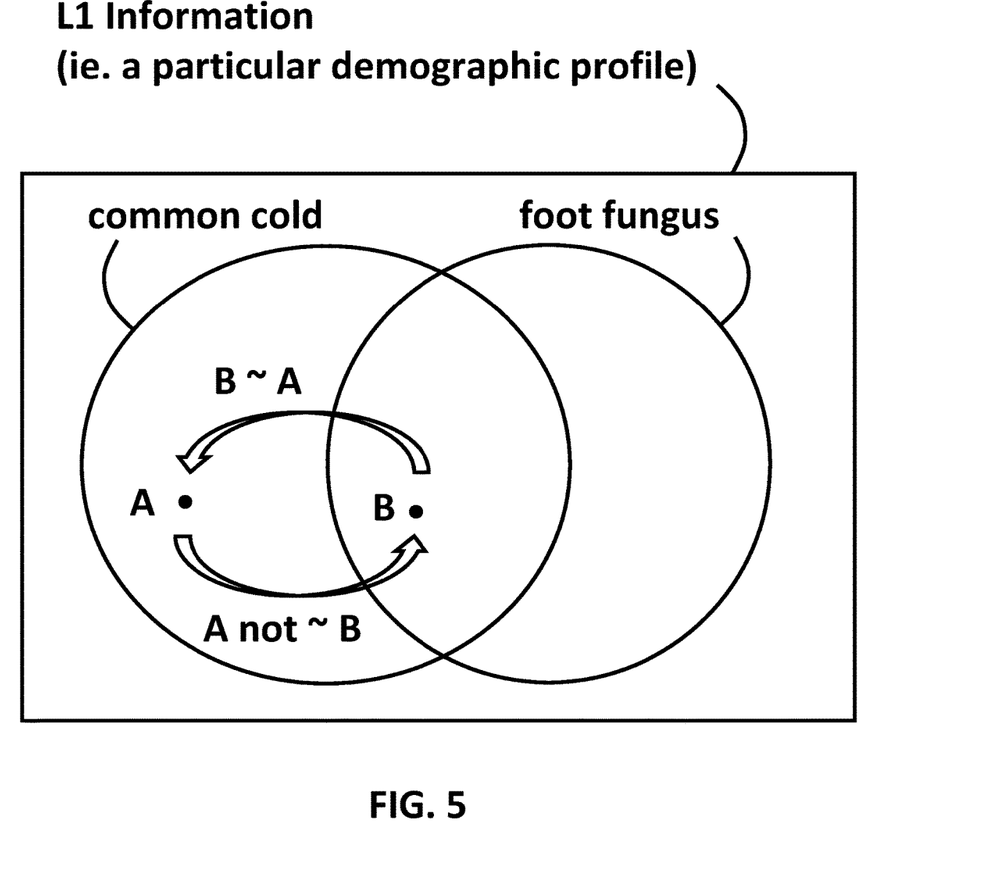
FIG. 5 illustrates a Venn diagram representation of using L2 information to distinguish patients, in accordance with an embodiment of the present disclosure.

For example, the L2 table may note that both person "A" and person "B" had suffered a common cold, but that only person "B" has also suffered a foot fungus. Therefore, person "A" looks like person "B", but person "B" does not look like person "A". In other words, a search for person "A" returns person "B" as a possible match (i.e., "B" is equivalent to "A"), but a search for person "B" does not return person "A" as a possible match (i.e., "B" is not equivalent to "A", and "A" is not equivalent to "B"), under an assumption that an adversary cannot definitively know that a patient has not had a particular medical event. FIG. 5 shows a Venn diagram to illustrate this scenario. Note that "B" has all the characteristics of "A" (i.e., a common cold and matching L1 demographic information), however "A" does not have all the characteristics of "B" (specifically, "A" lacks the foot fungus). Therefore, the L2 traits introduce asymmetry in evaluation of re-identification risk, because knowledge that a target had suffered a common cold gives a different re-identification risk than knowledge that a target had suffered a foot fungus.

A "journalist risk" is a term of art to refer to a risk that there exists at least one person in a dataset who can be re-identified, rendering ineffective the de-identification. Re-identification may embarrass or discredit the organization that performed the de-identification.

Embodiments may characterize a journalist risk when there is no assurance that a target is within a dataset, e.g., when the sample is smaller than the population (i.e., the sampling fraction is less than 1.0). This results in two different directions of attack, i.e., the public level data from the sample into the population, or someone from the population can be attacked using acquaintance level data towards the sample.

A "prosecutor risk" is a term of art to refer to a risk that a specific target person in a dataset can be re-identified when the attacker knows that the specific target person is in the dataset. For example, this specific target person may be the intruder's neighbor or a famous person. The attacker may have some background information about the target person, and then uses the background information to search for a matching record in the disclosed database.

Embodiments may characterize a prosecutor risk, where an adversary would know that a target is in fact within the dataset. For example, if a dataset has an entry for every person in the U.S., and the target is from the U.S., then the attacker would know that the target is in the dataset. Under the prosecutor risk scenario, there is no difference between population to sample risk.

In some embodiments, a registry refers to a database that is known with high assurance to include a record for all persons within a covered territory and/or time period (e.g., a state or the entire U.S.) who share a predetermined trait. For example, a male registry would list all males in the covered territory. In another example, a state or locality may maintain birth registry to record substantially all births that occur within the state or locality. Exceptions may occur on rare occasion, e.g., if an event is not reported in violation of law, or due to religious concerns, etc. Thus in a prosecutor risk scenario, an attacker wants to re-identify a target whom the attacker knows has given birth at a location and within time period covered by the registry. It would be a near certainty that the target would be listed in the registry. In contrasts, a journalist risk is ambiguous because there is uncertainty whether or not the target does in fact appear in the dataset.

In accordance with the present disclosure there is provided a method, computer readable memory and system for determining dataset re-identification risk in a computing device, the method comprising determining quasi-identifiers in the dataset; determining a risk measure to be assessed for the dataset; determining re-identification risk of the dataset for the determined risk measure based upon the determined quasi-identifiers; and presenting the determined re-identification risk for the dataset. The method may further comprise determining a sample size n, determining the equivalence class size $k_i$ in the sample of the $i^{th}$ patient and determining the equivalence class size $K_i$ in the population of the $i^{th}$ patient. The risk measure may use the qua-si-identifiers classified as public wherein the risk measure is for a Risk of Re-identification Sample to Population where n represents the number of patients the risk is determined by calculating in accordance with Equation (1):

$$Risk_{SampleToPopulation} = \frac{1}{n}\sum_{i=0}^{n}\frac{1}{K_i} \qquad (1)$$

The risk measure can be for measuring a Risk of Re-identification Population to Sample where n represents the number of patients the risk is determined by calculating in accordance with Equations (2) and (3), where "sf" represents a sampling fraction:

$$Risk_{PopulationToSample} = sf * \frac{1}{n}\sum_{i=0}^{n}\frac{1}{k_i} \qquad (2)$$

$$Represented\_Fraction = \frac{Sample\_Size}{represented\_Population} \qquad (3)$$

The represented fraction and the risk measure is determined by Equation (4) below:

$$Risk_{PopulationToSample} = \frac{n}{represented\_Population} * \frac{1}{n} * \sum_{i=0}^{n}\frac{1}{k_i} \qquad (4)$$

The represented population is determined by letting L be the set of L1 equivalence classes in the data where L1 equivalence classes are symmetric where Li is the size of the $i^{th}$ equivalence class. |L| is the number of equivalence classes the represented population is determined by Equation (5) below:

$$Represented\_Population = \sum_{i=0}^{|L|} L_i \qquad (5)$$

The represented population can be determined by $K_i$ or $k_i$ are estimated they may be less than 1 where if either value is less than 1, then it must be round up to 1 the represented population is determined by Equation (6) below:

$$\text{Represented\_Population} = \sum_{i=0}^{n} \frac{K_i}{k_i} \quad (6)$$

The Measure Risk for Population to Sample can be expressed by Equation (7) below:

$$\text{Risk}_{PopulationToSample} = \frac{n}{\sum_{i=0}^{n} \frac{K_i}{k_i}} * \frac{1}{n} * \sum_{i=0}^{n} \frac{1}{k_i} = \frac{1}{\sum_{i=0}^{n} \frac{K_i}{k_i}} * \sum_{i=0}^{n} \frac{1}{k_i} \quad (7)$$

The Public-Acquaintance (PA) Attack Model is intended to better model the journalist risk in sub sample datasets and to account for differences between quasi-identifiers (QIs) that are knowable to acquaintances or in public record. In prosecutor risk scenarios (i.e., registries), the PA has no effect. The PA model includes at least the following three advantages:

First, the PA model justifiably lowers the measured risk in sub-sample data sets;

Second, the PA model makes determination of QIs easier by asking a question "Who could know this QI"?

Third, the PA model better models potential attacks

Figure 1:
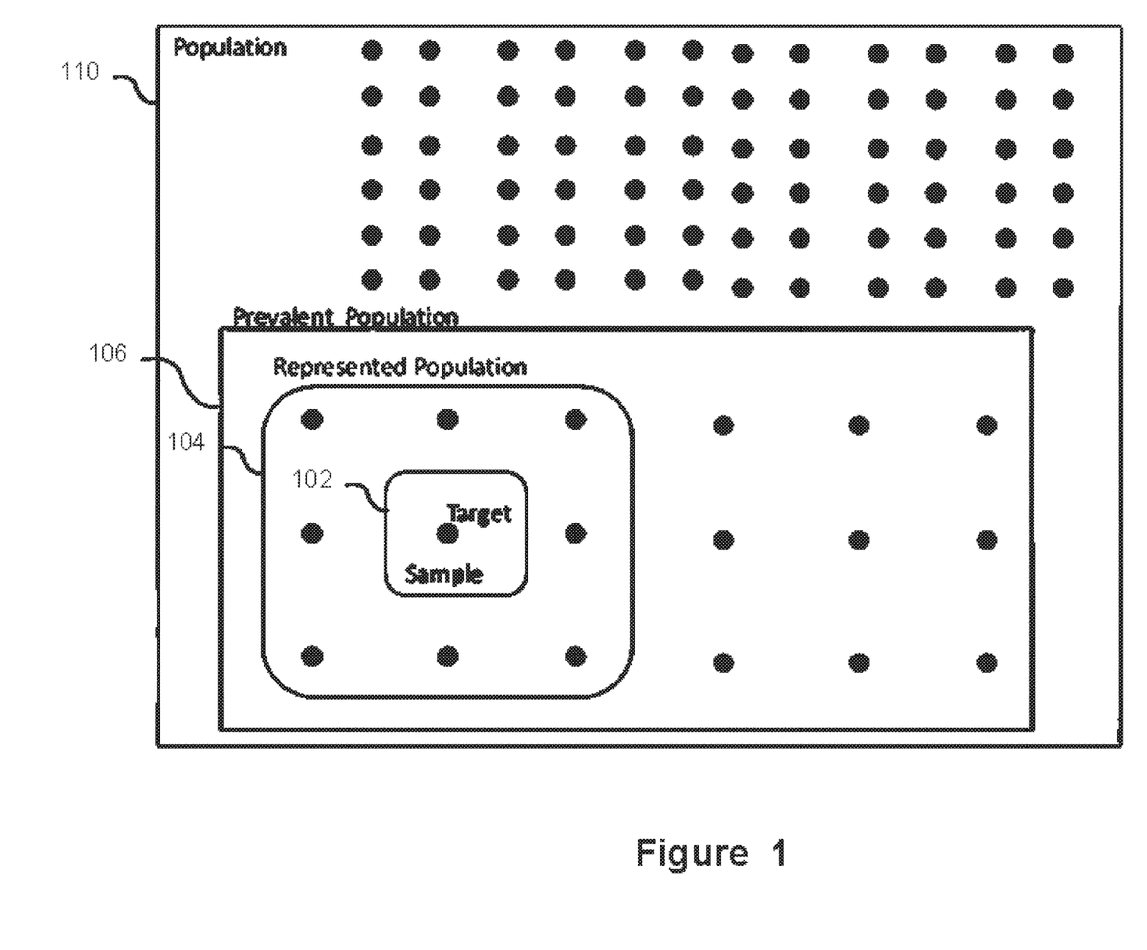
FIG. 1 shows a representation of a sample population in accordance with an embodiment of the present disclosure.

To understand PA, a good understanding of the idea of populations and a sample are described in relation to FIG. 1. The sample 102 in this case contains one person, the target. This sample represents nine people 104 in the people, i.e. the target looks like eight other people in the population.

The sample contains a randomly selected person from the prevalent population 106.

This is the group of people who could be in the dataset. ie. if the data set is about cancer, then this is all people who have cancer. In this example the prevalence is 1/5, or 18 people have breast cancer and could be in the dataset. This group of 18 people will be called the prevalent population to indicate the relationship to disease and that population size*prevalence=prevalent population size.

The sample is a subset of this, 1 patient in this case, and that patient only looks similar to half of the prevalent population. Thus, k=1, K=9, and N=18, where N is the prevalent population size.

The population 110 contains everyone, even people who do not have cancer. The sampling fraction is defined as the ratio between the sample and the prevalent population. The represented fraction is defined as the ratio between the sample and the represented population. From this point on, the prevalent population will be referred to as the population.

In the PA model, Quasi-Identifiers (QIs) are sub-divided into categories based on the largest (i.e., most general) group of people who can know a piece of information.

Public—This data is either publically available or the recipient has this data. Public data should structured, accessible to the recipient, and cover a large portion of the population, such as 1% or greater. A good test for public knowledge is "could the recipient look up this value for a large percentage of randomly selected people." While self-disclosure and newspapers are public knowledge, they are not structured and do not cover a large part of the population.

Acquaintance—A person can know this information if they are familiar with the person or if they see them. Acquaintance level knowledge also includes public information on celebrities and public figures that have their personal lives disclosed.

Acquaintance knowledge is not required to be structured or centralized, however it should be knowable by many acquaintances. A good test is "Would you know this value for 50% of your acquaintances?"

Two Attack Vectors

Two general attack vectors are defined:

First: Population to Sample (i.e., Acquaintance Attempt). This models an attacker choosing an acquaintance (or anyone whom they know great detail about, such as celebrity) from population and then attempting to re-identify them in the sub sample. There is chance that target is not even in the sample.

Second: Sample to Population (i.e., Public Attempt). This models an attacker selecting a subject from the sample, and then attempting to re-identify them against information in public registries. This attack cannot use acquaintance knowledge because there are no registries of acquaintance knowledge.

Both of these attacks exist in prior journalist risk measures, however they are not so formalized nor does journalist risk normally account for the differences between which QIs that are relevant in each attack.

With prior journalist risk measures, the risk from the sample to population attack does not decrease as sampling fraction decreases; however the risk on population to sample attacks does decrease significantly. Previously the effect was no decrease in risk when data is sub sampled. However now that Sample to Population uses public QIs, it has a much lower risk measure than Population to Sample thus Population to Sample tends to "dominate" the risk measurement. In addition, Population to sample decrease with sample size as would be expected.

Let us now reconsider a traditional Intentional Attempt (T1), a Spontaneous Recognition (T2), and a Breach (T3) attacks. T1 can be sub-divided into a Population to Sample (T1A) and a Sample to Population (T1B).

Optionally, the following categories can be considered:

A Demonstration Attack (T1C). In this category, there exists a high risk for all T1A and T1B patients. However, T1A patients are almost always have a higher risk with large datasets.

A Marketer Attack (T1D). In this category, an attacker may want to re-identify as many people as possible by linking known persons (i.e., the sample) against a database. This T1B attack may be repeated multiple times, because the re-identification starts from a known sample and is matched to the population.

The traditional attack will now account for the new attack vectors.

T1—For non-public datasets the risk is equal to Max (T1A, T1B).

$$T1 = pr(\text{attempt}) * \text{Max}(\text{Risk}_{PopulationToSample} * \text{Risk}_{SampleToPopulation})$$

$$= pr(\text{attempt}) * \text{Max}(T1A, T1B)$$

T2—Is spontaneous recognition of an acquaintance in a dataset—T2 starts from an acquaintance in the population. Thus this is Acquaintance attempt, however the attack already accounts for the probability that the attacker knows someone in the sub sample dataset.

$$T2 = pr(\text{acquaintance}) * \text{Risk}_{PopulationToSample} - pr(\text{acquaintance}) * T1A$$

T3—Breach—Accounts for the probability that the data gets out in the wild and has no controls. Attackers may use Acquaintance Attempt or Public Attempt thus which ever attack is higher must be considered.

$$T3 = pr(\text{breach}) * \text{Max}(\text{Risk}_{PopulationToSample}, \text{Risk}_{SampleToPopulation})$$
$$= pr(\text{breach}) * \text{Max}(T1A, T1B)$$

Measure PA Risk

In this section, measuring a risk of a sample to population attack (T1A) and a population to sample attack (T1B) are defined. Let "n" be a sample size, let "k" be an equivalence class size in a sample of the ith patient, i.e., there are "$k_i$" people in the sample who look like patient i. Let "$K_i$" be the equivalence class size in the population of the ith patient, i.e., there are $K_i$ people in the population who look like patient i.

Measuring the Risk of Re-identification Sample to Population, i.e. $\text{Risk}_{Sample\_To\_Population}$ Risk will be measured using the QIs classified as public (See the QI classification section above).

Let n represent the number of patients in the sample. Let $K_i$ represent the number of similar patients (equivalence class size) to the ith patient.

$$\text{Risk}_{SampleToPopulation} = \frac{1}{n} * \sum_{i=0}^{n} \frac{1}{K_i}$$

Measuring the Risk of Re-identification Population to Sample, i.e. $\text{Risk}_{Population\_To\_Sample}$ The probability of re-identification from population to sample depends on two factors: Whether the person in the sample, and how many people look like the person in the sample.

Risk will be measured using the QIs classified as public and acquaintance, as described elsewhere in this application.

The re-identification attack cannot succeed if the target is not in the sample. The probability of the target being in the sample is the sampling fraction. If the target is in the sample, then it is important to determine how many people could the target be mistaken for. This is calculated using prosecutor risk:

$$\text{Risk}_{Prosecutor} = \frac{1}{n} * \sum_{i=0}^{n} \frac{1}{k_i}$$

Thus to measure the Risk of Re-identification the equation is:

$$\text{Risk}_{PopulationToSample} = sf * \frac{1}{n} \sum_{i=0}^{n} \frac{1}{k_i}$$

However, instead of sampling fraction, the percentage of the population represented by the sample is used. Consider for example a scenario where a dataset is a random sub sample of cancer patients, however by chance there are no patients having a specific attribute, e.g., no 60 year old patients. Then an attacker interested in re-identifying a specific person having that specific attribute (e.g., re-identifying a person who is 60 years old) will not even attempt to attack the dataset because there is no one within the dataset matching the specific attribute of the target. Thus, the represented fraction is used instead of sampling fraction. The represented fraction is the fraction of people in the dataset divided by the number of people who could look like them.

$$\text{Represented\_Fraction} = \frac{\text{Sample\_Size}}{\text{represented\_Population}}$$

Thus the risk population is now $$\text{Risk}_{PopulationToSample} = \frac{n}{\text{represented\_Population}} * \frac{1}{n} * \sum_{i=0}^{n} \frac{1}{k_i}$$

However, Represented_Population is not easy to calculate with risk measurements that use similarity metrics, which are not symmetric. Two methods for estimating the represented population are used: an estimation based only on L1 demographic information, and an estimation based on an Equivalence class ratio.

Method 1—L1 Demographic Information

Let L be the set of L1 equivalence classes in the data. L1 equivalence classes are symmetric. Let $L_i$ be the size of the ith equivalence class. |L| is the number of equivalence classes.

$$\text{Represented\_Population} = \sum_{i=0}^{|L|} L_i$$

Method 2—Equivalence Class Ratio

This method is in more agreement with what would be done if the similarity metric was symmetric. Let "$K_i$" be the equivalence class size of this patient in the population. Let "$k_i$" be the equivalence class size of this patient in the sample. Because $K_i$ or $k_i$ are estimated they may be less than 1. If either value is less than 1, then it must be round up to 1.

$$\text{Represented\_Population} = \sum_{i=0}^{n} \frac{K_i}{k_i}$$

Using this approach the Measure Risk for Population to Sample can be expressed as:

$$\text{Risk}_{PopulationToSample} = \frac{n}{\sum_{i=0}^{n} \frac{K_i}{k_i}} * \frac{1}{n} * \sum_{i=0}^{n} \frac{1}{k_i} = \frac{1}{\sum_{i=0}^{n} \frac{K_i}{k_i}} * \sum_{i=0}^{n} \frac{1}{k_i}$$

It is currently assumed all L1 and demographic information is 100% knowable, however for non-demographic L1 public knowledge knowability values can be set for incomplete public dataset. (Note that public knowledge is assumed to be 100% knowable by an acquaintance). There may be public non-demographic L1 values that are in public data sets, but do not cover the entire population. Consider a public dataset of blood donors and their blood types, however the dataset is only covers about 3% of a population. To account for this low coverage, the knowability of this value can be set to 3%.

Note that T1A assumes most acquaintance knowledge is known and T1B accounts for public disclosures by setting the knowability of acquaintance-level QIs to between about 0.01-0.05.

Figure 2:
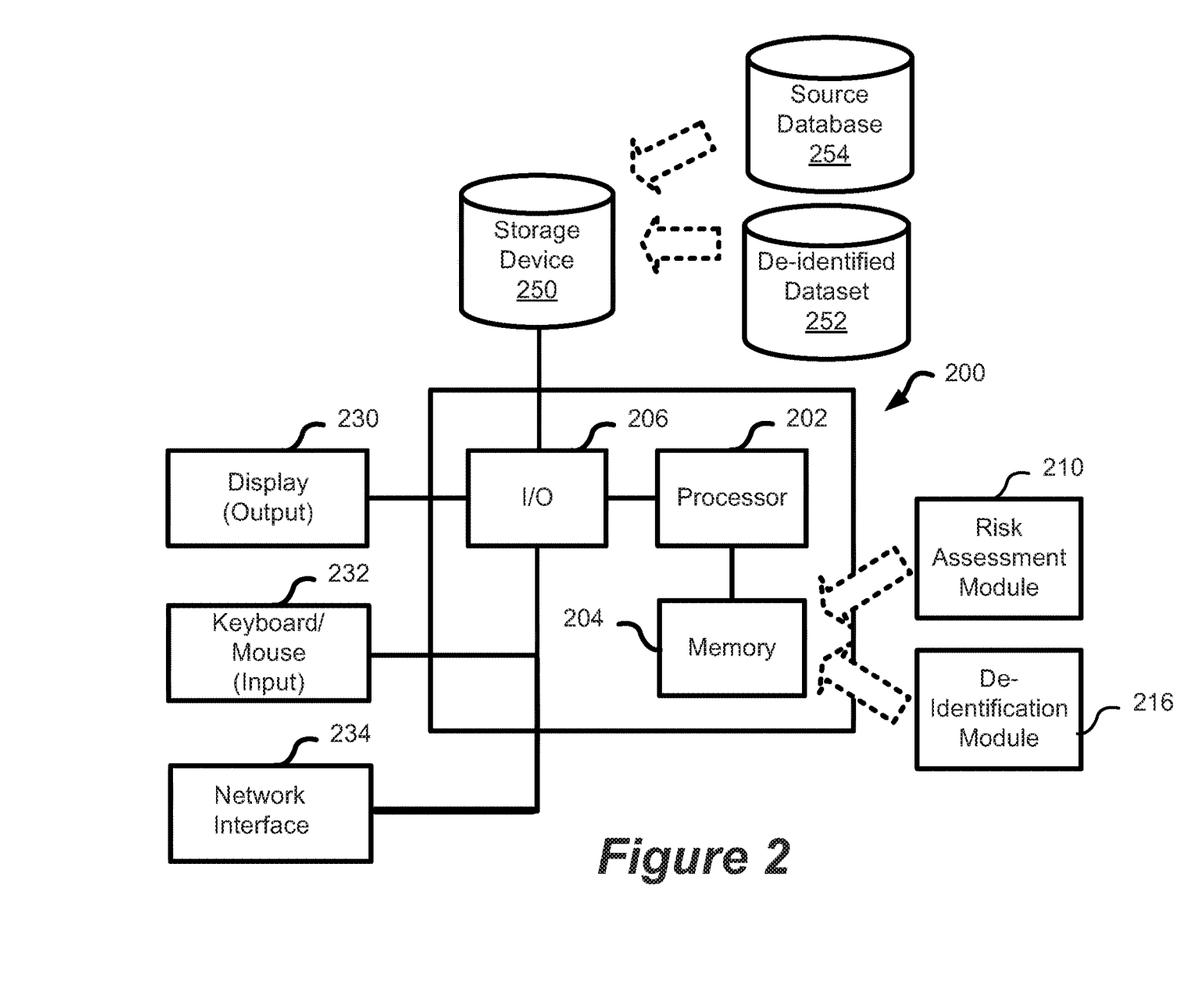
FIG. 2 shows a representation of system for determining re-identification risk of dataset in accordance with an embodiment of the present disclosure.

FIG. 2 shows a system 200 for performing risk assessment of a dataset, in accordance with an embodiment of the present disclosure. System 200 executes on a computer including a processor 202, memory 204, and input/output interface 206. Memory 204 executes instruction for providing a risk assessment module 210, which performs an assessment of re-identification risk. The risk assessment may also include a de-identification module 216 for performing further de-identification of the database or dataset based upon the assessed risk. A storage device 250, either connected directly to the system 200 or accessed through a network (not shown) stores the de-identified dataset 252 and possibly the source database 254 (from which the dataset is derived) if de-identification is being performed by the system. A display device 230 allows the user to access data and execute the risk assessment process. Input devices such as keyboard and/or mouse provide user input to the I/O module 206. The user input enables selection of desired parameters utilized in performing risk assessment, but may also be selected remotely through a web-based interface via network interface 234. The instructions for performing the risk assessment may be provided on a computer readable memory. The computer readable memory may be external or internal to the system 200 and provided by any type of memory such as read-only memory (ROM) or random access memory (RAM). The risk assessment process can determine a risk for population to sample and sample to population type attacks in order to aid in determining quasi-identifier de-identification or anonymization strategies to be applied to the dataset.

Figure 3:
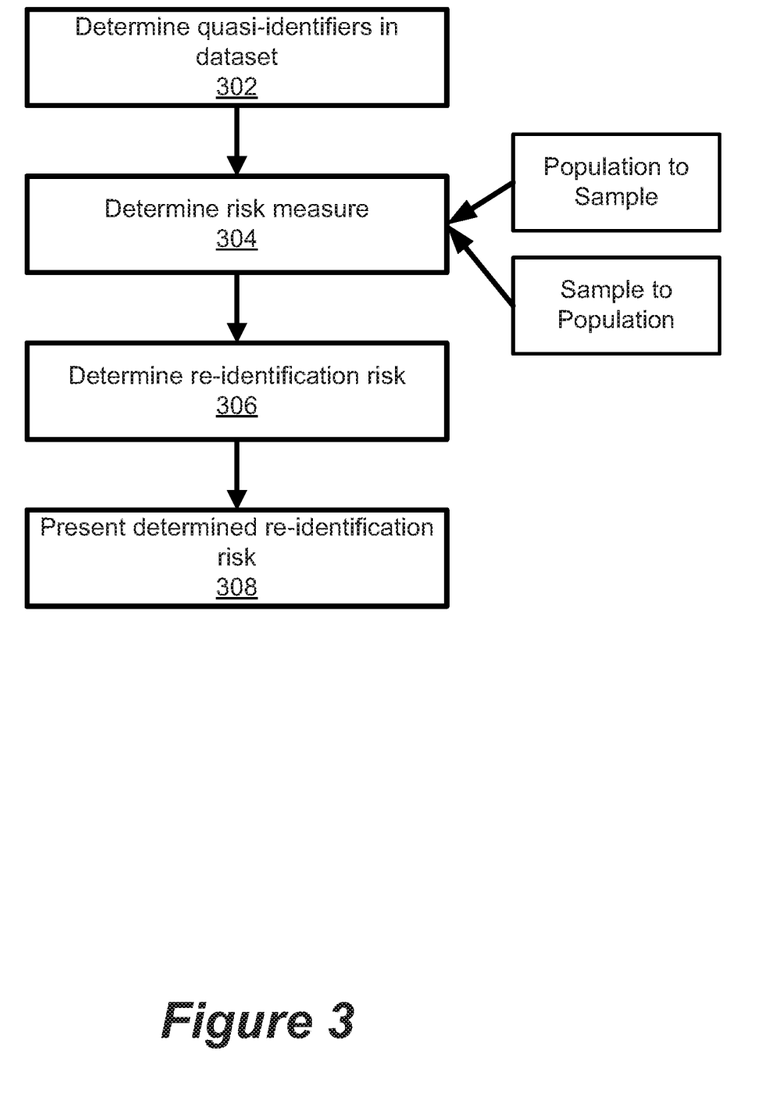
FIG. 3 shows a method of determining re-identification risk in accordance with an embodiment of the present disclosure.

FIG. 3 illustrates a method 300 to determine dataset re-identification risk in a computing device. At step 302, quasi-identifiers in the dataset are determined. Next, at step 304, a risk measure to be assessed for the dataset is determined. The risk measure may be population to sample or sample to population risk measure. Next, at step 306, the re-identification risk of the dataset for the determined risk measure is determined based upon the determined quasi-identifiers. Next, at step 308, the determined re-identification risk for the dataset is presented.

Figure 4:
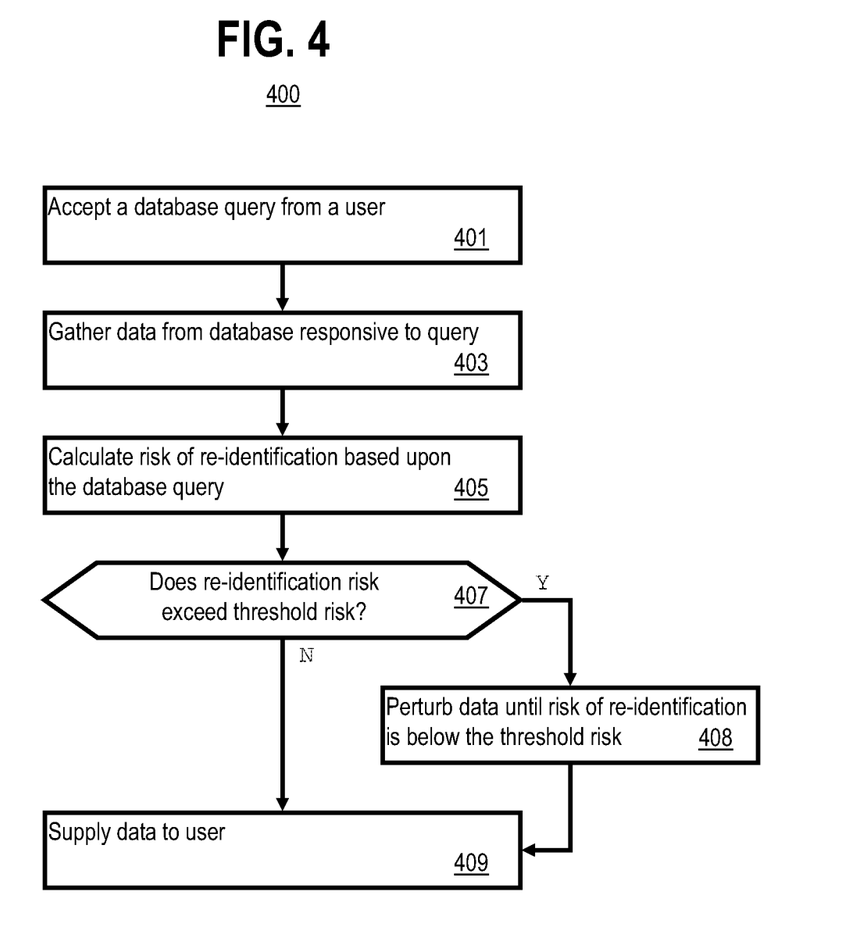
FIG. 4 illustrates a method to produce an identification of a cohort, members of the cohort having less than a predetermined risk of re-identification.

FIG. 4 illustrates a method 400 to produce an anonymized cohort, members of the cohort having less than a predetermined risk of re-identification, in accordance with an embodiment of the present disclosure. Method 400 begins at step 401, at which a database query is accepted from a user via a user-facing communication channel. The database query may be entered via, e.g., keyboard/mouse 232 of FIG. 2, or from a remote user or system via network interface 234. The database query may include requested traits that the members of the cohort should possess. For example, the database query may request persons between 50-60 years of age who suffer diabetes. During step 401, the query may be subject to initial screening by a processor such as processor 202 to ensure that on its face the query does not present an unacceptable risk of re-identification, e.g., the query is not for a specific name of patient, social security number, or other information that by itself is uniquely identifiable with one patient. If the query does not pass initial screening, the query will be canceled and optionally a user may be notified, e.g., via display 230 or via network interface 234. In some circumstances, a user may not be notified of cancellation of the query, e.g., in order not to encourage a potential attacker from fine-tuning an attack that would pass the initial screening. If the query passes the initial screening, the query may be transmitted to a database engine for further processing. In some embodiments, the database engine may be incorporated into I/O module 206. In other embodiments, the database engine may be implemented as a local processor incorporated into the database itself, e.g., in storage device 250. In some embodiments, the database engine may be incorporated into processor 202 by its execution of programmed instructions.

Next, method 400 progresses to step 403, at which the database engine receives the query from step 401 and, in response to the query, gathers data from a database via a database-facing communication channel, such as source database 254 and/or de-identified dataset 252. The database may include a distributed database, in which portions of the entire database may be stored remotely and/or within different respective physical storage apparatus. The gathered data may include anonymized data that includes the data (e.g., matching records) requested by the user. Alternatively or in addition, the database engine may provide a count of matching records, a count of all records in the database, and/or other metadata regarding the matching records rather than the anonymized records themselves.

Next, method 400 progresses to step 405, at which a processor such as processor 202, executing suitable programmed instruction code, calculates a risk of re-identification based upon the database query. The risk of re-identification may be based upon the count of matching records, the count of all records in the database, the count of records in the database that resemble or represent the query, and/or other metadata as provided by the database engine and/or as calculated by the processor from data provided by the database engine, e.g., from the anonymized data. The risk of re-identification may include calculation of a risk due to a public attack and/or acquaintance attack. The method of FIG. 3 may be usable as step 405.

Next, method 400 progresses to step 407, at which processor 202 compares the risk of re-identification to a predetermined threshold. The predetermined threshold may be settable by a user, and administrator, etc., based upon legal requirements, industry norms, contract requirements, etc. If the risk of re-identification is less than the threshold, then control of method 400 progresses to step 409 at which the data responsive to the query is supplied to the user. However, if the risk of re-identification exceeds the threshold, then control of method 400 progresses to step 408 at which the data may be perturbed until the risk of re-identification of the perturbed data is less than the threshold. If the risk of re-identification is equal to the threshold, control of method 400 may proceed (in different embodiments) to either step 408 or step 409, depending upon, e.g., how conservative the system should be. Upon conclusion of step 408, control of method 400 progresses to step 409 described above. Upon conclusion of step 409, method 400 may end. The data produced at step 409 is supplied without perturbation if the outcome of decision step 407 was that the risk of re-identification is less than the predetermined threshold. On the other hand, the data produced at step 409 is the perturbed data if the outcome of decision step 407 was that the risk of re-identification of the unperturbed data was greater than the pre-determined threshold. The data supplied from step 409 is usable as an anonymized cohort, members of the cohort having less than a predetermined risk of re-identification.

Each element in the embodiments of the present disclosure may be implemented as hardware, software/program, or any combination thereof. Software codes, either in its entirety or a part thereof, may be stored in a computer readable medium or memory (e.g., as a ROM, for example a non-volatile memory such as flash memory, CD ROM, DVD ROM, Blu-Ray™, a semi-conductor ROM, USB, or a magnetic recording medium, for example a hard disk). The program may be in the form of source code, object code, a code intermediate source and object code such as partially compiled form, or in any other form.

It would be appreciated by one of ordinary skill in the art that the system and components shown in FIGS. 1-4 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

Embodiments of the present disclosure include a system having one or more processing units coupled to one or more memories. The one or more memories may be configured to store software that, when executed by the one or more processing unit, allows practice of the embodiments described herein, at least by use of processes described herein, including at least in FIG. 3, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present disclosure may be dependent on various considerations, such as the speed or efficiency requirements of the system, the particular function, and the particular software or hardware systems being utilized.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the disclosure to the precise form disclosed. Modifications and variations are possible in light of the above teachings or may be acquired from practice of the disclosure. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the disclosure unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. § 112(f), and any claim without the word "means" is not so intended.

What is claimed is:

1. A method of lowering a risk of re-identification of one or more of a plurality of members of the method comprising steps of:
   on a processor:
   receiving a request for anonymized data comprising a subset of the plurality of members of the cohort having one or more requested traits;
   forming a dataset of a plurality of anonymized cohort records describing the members of the cohort having the one or more requested traits;
   determining one or more quasi-identifiers of the plurality of members in the dataset and a measure of risk of re-identification to be assessed for the dataset, the one or more quasi-identifiers comprise any of
   public quasi-identifiers known from public sources, and
   acquaintance quasi-identifiers known from private sources related to the plurality of members in the dataset;
   calculating a risk of re-identification of the one or more of the plurality of members of the cohort included in the dataset based upon the one or more quasi-identifiers and the determined measure of risk of re-identification;
   comparing the calculated risk of re-identification to a predetermined threshold;
   lowering the risk of re-identification below the predetermined threshold, without degrading the selected anonymized data, when the calculated risk of re-identification exceeds the predetermined threshold; and
   providing anonymized dataset in response to the request.

2. The method of claim 1, wherein the risk of re-identification is calculated separately for a public attack using public quasi-identifiers and separately for an acquaintance attack using public and acquaintance quasi-identifiers.

3. The method of claim 1, further comprising a step of perturbing the anonymized records in the dataset that exceed the predetermined threshold, until the risk of re-identification is not greater than the pre-determined threshold.

4. The method of claim 1, wherein the step of calculating a risk of re-identification further comprises the steps of:
   combining pre-existing external dataset and the formed dataset.

5. The method of claim 3, wherein the step of perturbing comprises changing a size of the formed dataset.

6. The method of claim 3, wherein the step of perturbing comprises changing a quantity of records in the dataset.

7. The method of claim 3, wherein the step of comprises changing a value in at least one record in the dataset.

8. The method of claim 3, wherein the step of perturbing comprises including in the dataset at least one record that does not meet all of the requested traits.

9. A system to of lower a risk of re-identification of one or more of a plurality of members of a cohort, the system comprising:
   providing a processor configured to:
   receive a request for anonymized data comprising a subset of the plurality of members of the cohort having one or more requested traits;

form a dataset of a plurality of anonymized cohort records describing the members of the cohort having the one or more requested traits;
determine one or more quasi-identifiers of the plurality of members in the dataset and a measure of risk of re-identification to be assessed for the dataset, the one or more quasi-identifiers comprise any of
  public quasi-identifiers known from public sources, and acquaintance quasi-identifiers known from private sources related to the plurality of members in the dataset;
calculate a risk of re-identification of the one or more of the plurality of members of the cohort included in the dataset based upon the one or more quasi-identifiers and the determined measure of risk of re-identification;
compare the calculated risk of re-identification to a pre-determined threshold;
lower the risk of re-identification below the predetermined threshold, without degrading the selected anonymized data, when the calculated risk of re-identification exceeds the predetermined threshold; and
provide the anonymized dataset in response to the request.

10. The system of claim 9, wherein the risk of re-identification is calculated separately for a public attack using public quasi-identifiers and for an acquaintance attack using public and acquaintance quasi-identifiers.

11. The system of claim 9, wherein the processor is further configured to perturb the anonymized records in the dataset that exceed the predetermined threshold, until the risk of re-identification is not greater than the pre-determined threshold.

12. The system of claim 9, wherein the risk of re-identification is calculated by combining pre-existing external dataset and the formed dataset.

13. The system of claim 11, wherein perturbing comprises changing a size of the formed dataset.

14. The system of claim 11, wherein perturbing comprises changing a quantity of records in the dataset.

15. The system of claim 11, wherein perturbing comprises changing a value in at least one record in the dataset.

16. The system of claim 11, wherein perturbing comprises including in the dataset at least one record that does not meet all of the requested traits.

* * * * *

UNITED STATES PATENT AND TRADEMARK OFFICE
CERTIFICATE OF CORRECTION

PATENT NO. : 10,242,213 B2
APPLICATION NO. : 15/271664
DATED : March 26, 2019
INVENTOR(S) : Martin Scaiano et al.

Page 1 of 1

It is certified that error appears in the above-identified patent and that said Letters Patent is hereby corrected as shown below:

In the Specification

In Column 11, Line 24, replace "k" with "$k_i$".

In Column 17, Line 12, replace "k" with "$k_i$".

In Column 18, Line 41, replace "k" with "$k_i$".

Signed and Sealed this
Fourth Day of June, 2019

Andrei Iancu
*Director of the United States Patent and Trademark Office*